United States Patent
Dewhurst

(10) Patent No.: US 10,467,732 B2
(45) Date of Patent: Nov. 5, 2019

(54) EFFICIENT STORAGE FOR PRODUCTION OF HIGH DYNAMIC RANGE IMAGES

(71) Applicant: Apical Ltd, Cambridge (GB)

(72) Inventor: Andrew Dewhurst, Cambridge (GB)

(73) Assignee: Apical Limited, Cambridge (GB)

( * ) Notice: Subject to any disclaimer, the term of this patent is extended or adjusted under 35 U.S.C. 154(b) by 134 days.

(21) Appl. No.: 15/827,120

(22) Filed: Nov. 30, 2017

(65) Prior Publication Data
US 2018/0082408 A1 Mar. 22, 2018

Related U.S. Application Data

(63) Continuation of application No. PCT/EP2016/062432, filed on Jun. 1, 2016.

(30) Foreign Application Priority Data

Jun. 1, 2015 (GB) .................................. 1509384.2

(51) Int. Cl.
| | |
|---|---|
| *G06T 5/50* | (2006.01) |
| *G06T 5/00* | (2006.01) |
| *H04N 5/235* | (2006.01) |
| *G06T 5/40* | (2006.01) |

(52) U.S. Cl.
CPC .............. *G06T 5/007* (2013.01); *G06T 5/40* (2013.01); *G06T 5/50* (2013.01); *H04N 5/2355* (2013.01); *G06T 2207/10144* (2013.01); *G06T 2207/20208* (2013.01)

(58) Field of Classification Search
CPC .......... G06T 5/007–5/009; G06T 2207/20208; G06T 5/50; G06T 2207/10144; H04N 5/355–5/3559; H04N 5/35581; H04N 19/98
See application file for complete search history.

(56) References Cited

U.S. PATENT DOCUMENTS

| | | |
|---|---|---|
| 2005/0179794 A1 | 8/2005 | Misawa |
| 2010/0259626 A1 | 10/2010 | Savidge |
| 2011/0150357 A1 | 6/2011 | Prentice |
| 2014/0184894 A1* | 7/2014 | Motta .................. H04N 5/2353 348/362 |

OTHER PUBLICATIONS

International Search Report dated Sep. 27, 2016 on related PCT Application No. PCT/EP2016/062432 filed Jun. 1, 2016.

* cited by examiner

*Primary Examiner* — Brian Werner
(74) *Attorney, Agent, or Firm* — EIP US LLP

(57) ABSTRACT

Methods, apparatus and computer programs are provided for storing a set of sensor output images for multi-exposure high dynamic range processing to produce a processed image. The multi-exposure high dynamic range processing combines pixel values from one or more of the sensor output images to produce the processed image. In one example, a method comprises receiving from an image sensor a first sensor output image. The first sensor output image has a first exposure. The method also comprises receiving from the image sensor a second sensor output image. The second sensor output image has a second exposure different than the first exposure. First image pixels of the first sensor output image having pixel values which are unlikely to have a substantial contribution to the processed image are identified, and the amount of information stored in relation to the first image pixels is reduced on the basis of the identifying step.

17 Claims, 9 Drawing Sheets

EFFICIENT STORAGE FOR PRODUCTION OF HIGH DYNAMIC RANGE IMAGES

CROSS-REFERENCE TO RELATED APPLICATIONS

This application is a continuation under 35 U.S.C. § 120 of International Application No. PCT/EP2016/062432, filed Jun. 1, 2016, which claims priority to United Kingdom Application No. GB 1509384.2, filed Jun. 1, 2015, under 35 U.S.C. § 119(a). Each of the above-referenced patent applications is incorporated by reference in its entirety.

BACKGROUND

Field of the Disclosure

The present disclosure relates to methods, apparatus and computer readable storage media for producing high dynamic range images.

Description of the Related Technology

High dynamic images are images that represent a wider dynamic range of luminosity than is typically possible with standard imaging techniques. Image sensors capable of capturing high dynamic range (HDR) images are available from various manufacturers. A widely adopted technique to capture such images is to take multiple exposures in quick succession, each exposure calculated for a different sensitivity to light (for example by varying the exposure duration) which are then combined (or "stitched") into a single HDR exposure.

Some image sensors comprise multiple light detecting elements, arranged as lines of pixels. For instance a high definition sensor could be assembled from 1080 lines of pixels, each line comprising a row of 1920 pixels.

In order to combine multiple exposures from a sequence, pixels read back from each of the exposures must first be temporarily stored, such that at the time of combining the exposures (to form the resulting HDR image), the equivalent pixel of each exposure is available simultaneously.

For example, the top left pixel of the HDR image may be generated by combining the top left pixel of each of the constituent exposures. Methods for combining these pixels are well-known.

The requirement to store image data from one or more exposures to achieve this combination of pixel data makes significant demands on camera systems. Firstly, data storage capacity is expensive and on-chip solutions require prohibitively large silicon area. Secondly the high data bandwidth required to transfer large amounts of data to storage devices competes with other system resources. Thirdly, data traffic to and from storage results in high power consumption, especially when storage is by means of external memory, such as DDR memory—a typical configuration of a portable device.

There is thus a need for a method to reduce this storage requirement and significantly reduce bandwidth requirements of multi-exposure HDR camera systems.

SUMMARY

According to a first aspect, there is provided a method for storing a set of sensor output images for multi-exposure high dynamic range processing to produce a processed image, wherein the multi-exposure high dynamic range processing combines pixel values from one or more of the sensor output images to produce the processed image. The method includes receiving, from an image sensor, a first sensor output image. The first sensor output image has a first exposure. The method includes receiving, from the image sensor, a second sensor output image. The second sensor output image has a second exposure different than the first exposure. The method includes identifying first image pixels of the first sensor output image having pixel values which are unlikely to have a substantial contribution to the processed image. The method includes reducing the amount of information stored in relation to the first image pixels on the basis of the identifying step.

The identification of pixels as unlikely to have a substantial contribution to the processed image allows a reduction in bandwidth required to transmit the first sensor output image for storage, a reduction in storage space required to store the first sensor output image, and also allows an increase in efficiency of subsequent processing required to produce the high dynamic range image.

The method may include identifying second image pixels of the second sensor output image having pixel values which are unlikely to have a substantial contribution to the processed image. The method may further include reducing the amount of information stored in relation to the second image pixels on the basis of the identifying step.

The identification of pixels as unlikely to have a substantial contribution to the processed image allows a reduction in bandwidth required to transmit the second sensor output image for storage, a reduction in storage space required to store the second sensor output image, and also allows an increase in efficiency of subsequent processing required to produce the high dynamic range image.

The method may include processing the first and second images to produce a multi-exposure high dynamic range image. The processing excludes pixels identified as having pixel values which are unlikely to have a substantial contribution to the processed image. The exclusion of pixels identified as unlikely to have a substantial contribution allows decreased bandwidth and storage, and increased efficiency of processing.

In some embodiments, the second exposure is smaller than the first exposure and the first image pixels are identified on the basis of having a pixel value which is more than or equal to a predetermined threshold. This allows excessively saturated pixels, which are not likely to contribute to the high dynamic range image because corresponding pixels from the second sensor output image are likely to be selected for use in the high dynamic range image, to be identified as such.

In other embodiments, in which the second exposure is greater than the first exposure, the first image pixels are identified on the basis of having a pixel value which is less than or equal to a predetermined threshold. This allows relatively dark pixels, with a relatively low signal to noise ratio, which are not likely to contribute to the high dynamic range image because corresponding pixels from the second sensor output image are likely to be selected for use in the high dynamic range image, to be identified as such.

The method may include receiving from the image sensor a third image. The third image has a third exposure smaller than the first exposure and greater than the second exposure. The method may include identifying as excluded from the third image pixels of the third image having pixel value between two predetermined thresholds.

This allows decreased bandwidth and storage, and increased efficiency of processing, as described above, in embodiments in which at least three images are processed to produce the high dynamic range image.

In some embodiments, at least one of the thresholds is selected based on a noise profile of the image sensor. This allows exclusion of pixels corresponding to image intensity levels associated with undesired noise levels.

In some embodiments, at least one of the thresholds is based on the ratio of the first exposure to the third exposure, and/or at least one of the thresholds is based on the ratio of the third exposure to the second exposure, and/or at least one of the thresholds is based on the ratio of the first exposure to the second exposure.

This allows saturated and/or relatively dark pixels to be excluded from particular images as required, as will be described in more detail below.

Reducing the amount of information stored in relation to the first image pixels may include representing the first image pixels using a run-length encoding algorithm. This allows efficient compression of the first and/or second images, which allows reduced bandwidth and storage requirements for transmitting and storing the images.

The predetermined threshold may, in some embodiments, include a maximum pixel value of the first image. This allows exclusion of saturated pixels from the first image. Analogously, the predetermined threshold may include a minimum pixel value of the second image. This allows exclusion of relatively dark pixels from the first image.

According to aspects of the present disclosure, there is provided an apparatus for storing a set of sensor output images for multi-exposure high dynamic range processing to produce a processed image, wherein the multi-exposure high dynamic range processing combines pixel values from one or more of the sensor output images to produce the processed image. The apparatus includes an image sensor. The apparatus includes a first encoder configured to receive from the image sensor a first sensor output image. The first sensor output image has a first exposure. The first encoder is configured to produce a modified version of the first sensor output image. Producing the modified version of the first image includes identifying first image pixels of the first sensor output image having pixel values which are unlikely to have a substantial contribution to the processed image. Producing the modified version of the first image includes reducing the amount of information stored in relation to the first image pixels on the basis of the identifying step. The apparatus includes a first buffer storage configured to receive and store the modified version of the first image; a second encoder configured to receive, from the image sensor, a second sensor output image. The second sensor output image has a second exposure different than the first exposure. The second encoder is configured to produce a modified version of the second sensor output image. Producing the modified version of the second image includes identifying second image pixels of the second sensor output image having pixel values which are unlikely to have a substantial contribution to the processed image, and reducing the amount of information stored in relation to the second image pixels on the basis of the identifying step. The apparatus includes a second buffer storage configured to receive and store the modified version of the second image. This also allows reduction in buffer storage size required to store the modified versions of the first and second sensor output images, and allows increased efficiency of processing the modified versions of the first and second sensor output images, as described above.

In some embodiments, the apparatus includes a high dynamic range image constructor configured to receive the modified version of the first sensor output image from the first buffer, receive the modified version of the second sensor output image from the second buffer, and process the modified version of the first sensor output image and the modified version of the second sensor output image to produce the multi-exposure high dynamic range image. The processing excludes pixels identified as having pixel values which are unlikely to have a substantial contribution to the processed image. The exclusion of pixels identified as unlikely to have a substantial contribution allows efficient processing required to produce the high dynamic range image.

In some embodiments, the first buffer stores the modified version of the first sensor output image as a first compressed image and/or the second buffer stores the modified version of the second sensor output image as a second compressed image. Storing the first and/or second compressed images may include using a run-length encoding algorithm to indicate pixels excluded from the modified versions of the first and/or second images. This allows efficient storage of the modified versions of the first and/or second images in the first and/or second buffers.

The first and second buffers may be configured to simultaneously transmit the modified versions of the first and second sensor output images to a, or the, high dynamic range image constructor. This allows the constructor to apply logic including comparing pixels of the first and second images.

According to a further aspect of the present disclosure, there is provided a non-transitory computer-readable storage medium including a set of computer-readable instructions stored thereon which, when executed by at least one processor, cause the at least one processor to receive from an image sensor a first sensor output image. The first sensor output image has a first exposure. The set of computer-readable instructions, when executed by the at least one processor, cause the at least one processor to identify, as excluded from the first sensor output image, pixels of the first sensor output image having pixel value equal to or greater than a first threshold, the first threshold corresponding to a first image intensity. The set of computer-readable instructions, when executed by the at least one processor, cause the at least one processor to receive from the image sensor a second sensor output image. The second sensor output image has a second exposure smaller than the first exposure. The set of computer-readable instructions, when executed by the at least one processor, cause the at least one processor to identify, as excluded from the second sensor output image, pixels of the second sensor output image having pixel value less than or equal to a second threshold. The second threshold corresponds to a second image intensity lower than the first image intensity. The set of computer-readable instructions, when executed by the at least one processor, cause the at least one processor to receive from the image sensor a third sensor output image. The third sensor output image has a third exposure smaller than the first exposure and greater than the second exposure. The set of computer-readable instructions, when executed by the at least one processor, cause the at least one processor to identify, as excluded from the third sensor output image, pixels of the third sensor output image having pixel value greater than or equal to a third threshold and less than or equal to a fourth threshold. The third threshold corresponds to a third image intensity lower than the first image intensity and the fourth threshold corresponds to a fourth image intensity higher than the second image intensity. The set of computer-readable instructions, when executed by the at least one processor, cause the at least one processor to process the first, second and third sensor output images to produce a multi-exposure high dynamic range image. The processing excludes pixels identified as excluded from the first sensor output image, excludes pixels identified as excluded from the second sensor output image and excludes pixels identified as excluded from the third sensor output image.

This allows reduction in bandwidth required to transmit the first, second and third sensor output images. This also allows reduction in buffer storage size required to store the first, second and third sensor output images, and allows increased efficiency of processing the first, second and third sensor output images to produce the high dynamic range image, as described above.

Further features and advantages will become apparent from the following description of preferred embodiments, given by way of example only, which is made with reference to the accompanying drawings.

DETAILED DESCRIPTION

Figure 1A:
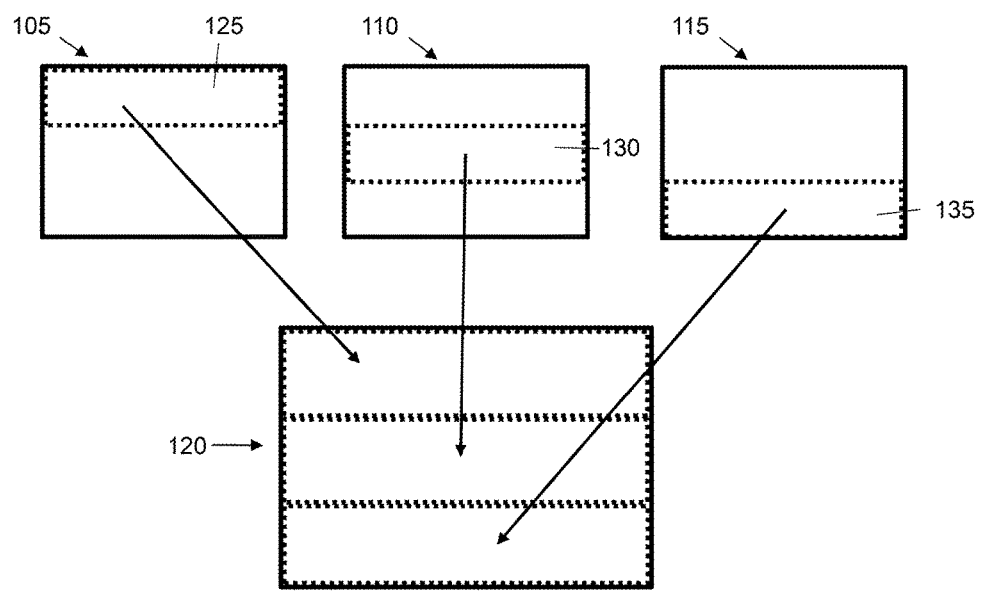
FIG. 1a shows a schematic representation of processing three exposures of the same scene to produce a multi-exposure high dynamic range image, according to some embodiments.

FIG. 1a shows a schematic representation of processing three images 105, 110, 115 of the same scene to produce a multi-exposure HDR image 120. The sensitivity of an image to incident light may be expressed as an "exposure". Exposure may be varied by changing parameters of an imaging device such as a camera. For example, exposure may be reduced by reducing the length of time that light is incident on an image sensor, for example by reducing the length of time for which a shutter is held open. This may be termed the integration time. Another example of such a parameter is the analogue and/or digital gain of the image sensor, which expresses the sensitivity of the sensor to light. A third example of such a parameter is the focal ratio, or "f-stop". The exposure of an image may be expressed as a function of at least one of these parameters, for example as a single value expressing the overall sensitivity to light. For example, doubling the gain of the image sensor and halving the integration time may have no net effect on the exposure. A combination of settings resulting in a higher sensitivity to light may be termed a greater exposure, and a combination of settings resulting in a lower sensitivity to light may be termed a smaller exposure. As is common in the art, the term "exposure" may also be used to refer to an image with a particular exposure value. In the following, the exposure is varied in terms of exposure time, but it will be appreciated that varying other parameters of the image sensor relating to exposure will have the same effect.

The first exposure 105 has a longer exposure than the second exposure 110, and the second exposure 110 has a longer exposure than the third exposure 115. A longer exposure causes an exposure to be more sensitive to details in areas of low light and also causes brighter areas to be saturated. Conversely, a shorter exposure causes an exposure to be more sensitive to details in areas of bright light, and also causes loss of detail in darker areas.

A single combined HDR image 120, with detail across a wider range of light intensities than any single exposure 105, 110, 115, can be produced by combining different areas of the three exposures. In FIG. 1, the darkest area 125 of the HDR image 120 is captured from the longest exposure 105, an area 130 of medium darkness is taken from the medium length exposure 110, and the brightest area 135 is taken from the shortest exposure 115. As such, areas of exposures 105, 110, 115 that are saturated or dark do not contribute to the combined HDR image 120.

Figure 1B:
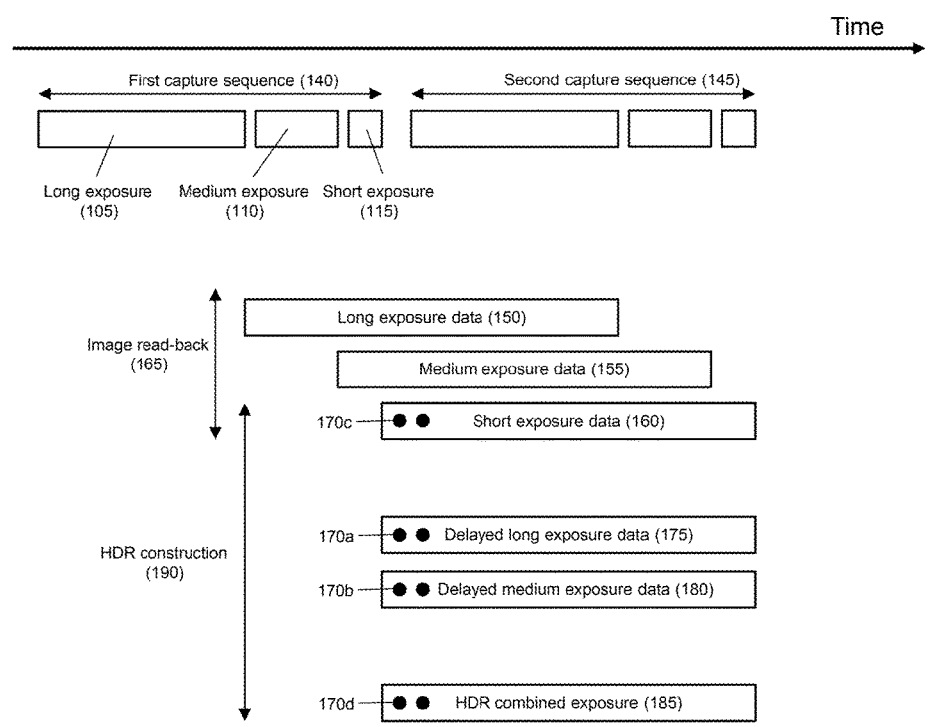
FIG. 1b shows a schematic representation of timing of processing three exposures of the same scene to produce a multi-exposure high dynamic range image, according to some embodiments.

FIG. 1b shows a schematic representation of timing of processing three exposures of the same scene, such as those shown in FIG. 1a, to produce a multi-exposure high dynamic range image. During a first capture sequence 140, an image sensor sequentially produces a long exposure 105, a medium exposure 110, and a short exposure 115. The first capture sequence 140 may be followed by a second capture sequence 145 of the same or a different scene.

Following capture of the long exposure 105, long exposure data 150 from the long exposure 105 is read back, for example into storage such as buffer storage. Similarly, medium exposure data 155 is read back following capture of the medium exposure 110, and short exposure data 160 is read back following capture of the short exposure 115. These operations may together be termed an image read-back sequence 165.

For construction of an HDR image, it may be desirable to simultaneously receive at an HDR constructor corresponding pixels from each exposure. For example, it may be desirable to receive a given pixel 170a from the long exposure simultaneously with pixels 170b from the medium exposure and 170c from the short exposure, wherein pixels 170a-c have the same x-y position. To facilitate this, the short exposure 160 may be transmitted directly to the HDR constructor. Simultaneously, a delayed version 175 of the long exposure data and a delayed version 180 of the short exposure data may be delivered to the HDR, with the delay set such that pixels 170a, 170b and 170c arrive simultaneously at the HDR constructor. These pixels may then be combined using known HDR construction techniques to form pixel 170d of the combined HDR image 185. These operations may together be termed HDR construction 190 or HDR image composition.

Figure 2:
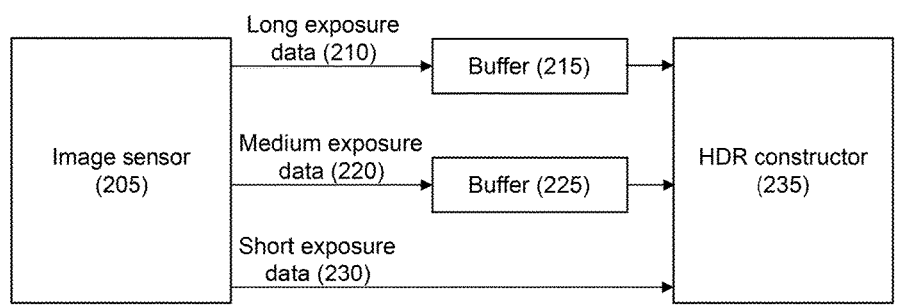
FIG. 2 shows an example architecture for storing image data from three exposures, according to some embodiments.

FIG. 2 shows an example architecture for producing an HDR image from three exposures, for example those shown in FIG. 1a. In one example an image sensor 205 captures a first, long exposure 105. Long exposure data 210 from the first exposure 105 is stored in a first buffer 215. The image sensor 205 then captures a second, medium exposure 110, medium exposure data originating from which is stored in a second buffer 225. The image sensor 205 then captures a third, short exposure 115. Short exposure data 230 from the exposure 115 is transmitted to an HDR constructor 235, along with the long exposure data from the first buffer 215 and the medium exposure data from the second buffer 225. The HDR constructor then produces an HDR image from the three exposures 105, 110, 115, for example as shown in FIG. 1a. In other examples, the three exposures 105, 110, 115 are produced in a different order to that shown in FIG. 2.

Figure 3:
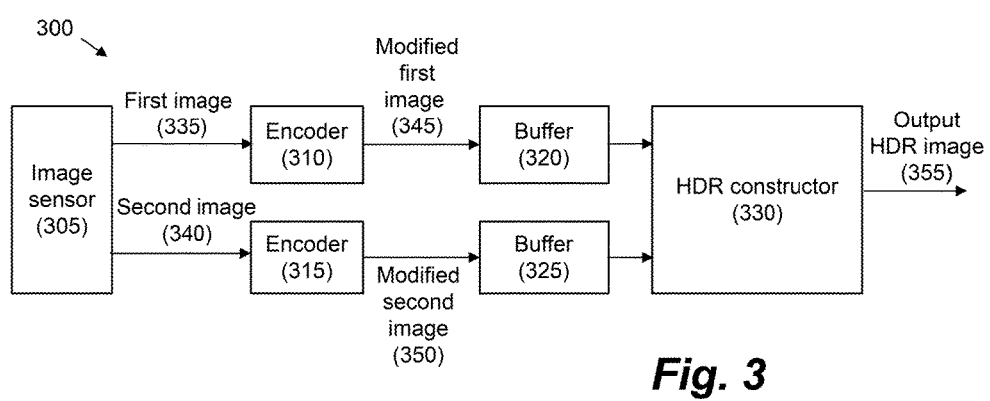
FIG. 3 shows an example apparatus for producing a multi exposure high dynamic range image, according to some embodiments.

FIG. 3 shows an apparatus for storing a set of sensor output images for multi-exposure high dynamic range processing to produce a processed image, wherein the multi-exposure high dynamic range processing combines pixel values from one or more of the sensor output images to produce the processed image, according to an aspect of the present disclosure. The apparatus 300 comprises an image sensor 305, a first encoder 310, a second encoder 315, a first buffer 320 and a second buffer 325. The apparatus may comprise a high dynamic range image constructor 330. The first and second buffers 320, 325 may, for example, comprise static random access storage (SRAM). The first encoder 310 is configured to receive from the image sensor 305 a first sensor output image 335 having a first exposure, and to produce a modified version 345 of the first image.

Producing the modified version 345 of the first image 335 comprises identifying first image pixels of the first sensor output image 335 having pixel values which are unlikely to have a substantial contribution to the processed image, and reducing the amount of information stored in relation to the first image pixels on the basis of this identifying. This may for example comprise identifying as excluded from the modified version 345 of the first image 335 pixels of the first image 335 having pixel value equal to or greater than a pre-defined threshold. For example, the first exposure may be sufficiently long that bright areas of the first image 335 are saturated, having a maximum pixel value. The threshold may be set such that such saturated areas are excluded from the modified version 345 of the first image 335, as will be described in more detail below.

The first buffer 320 is configured to receive and store the modified version 345 of the first image 335.

The second encoder 315 is configured to receive from the image sensor 305 a second sensor output image 340, wherein the second image 340 has a second exposure different than the first exposure, and to subsequently produce a modified version 350 of the second sensor output image 340.

Producing the modified version 350 of the second sensor output image 340 comprises identifying second image pixels of the second sensor output image 340 having pixel values which are unlikely to have a substantial contribution to the processed image, and reducing the amount of information stored in relation to the second image pixels on the basis of the identifying step. Where the second exposure is shorter than the first exposure, this may for example comprise identifying as excluded from the modified version 350 of the second image 340 pixels of the second image 340 having pixel value equal to or less than a second threshold, the second threshold being lower than the first threshold. For example, the second exposure may be sufficiently short that dark areas of the second image 340 are relatively dark. The second threshold may be set such that these dark areas are excluded from the modified version 350 of the second image 340, as will be described in more detail below.

The second buffer 325 is configured to receive and store the modified version 350 of the second sensor output image 340. In some embodiments, the apparatus 300 comprises a single buffer configured to store the modified versions 345, 350 of the first and second sensor output images. In such embodiments, the single buffer may typically store a flag for each image identifying that image as the modified version of the first or second sensor output image.

The first buffer 320 may store the modified version 345 of the first sensor output image 335 as a first compressed image. The second buffer 325 may store the modified version 350 of the second sensor output image 340 as a second compressed image. As images typically comprise contiguous regions of dark pixels and contiguous regions of light pixels, this compression may for example be performed using known run-length encoding algorithms to indicate pixels excluded from the modified versions of the first and/or second sensor output images. This reduces the transmission bandwidth required for transmitting the first and second images 335, 340 and the modified versions of these 345, 350. This also reduces the buffer storage space required for storing the modified versions 345, 350.

Where the apparatus comprises a high dynamic range image constructor 330, the high dynamic range image constructor 330 may be configured to receive the modified version 345 of the first sensor output image 335 from the first buffer 320 and to receive the modified version 350 of the second sensor output image 340 from the second buffer 325. The high dynamic range image constructor 330 is configured to process the modified version 345 of the first sensor output image 335 and the modified version 350 of the second sensor output image 340 to produce and output a multi-exposure high dynamic range image 355. The processing excludes pixels identified as having pixel values which are unlikely to have a substantial contribution to the processed image. For example, in embodiments in which pixels are identified such that saturated and relatively dark areas are excluded, this may typically have little effect on the final HDR image 355 because, as explained above in relation to FIG. 1, such areas do not contribute to the HDR image 355.

The high dynamic range image constructor 330 may be configured to simultaneously receive the modified version 345 of the first sensor output image 335 from the first buffer 320 and receive the modified version 350 of the second sensor output image 340 from the second buffer 325. This allows the images to be processed together during production of the HDR image 355, such that the constructor 330 may apply known HDR construction algorithms to select areas of the first and second modified images 345, 350 for inclusion in the HDR image 355.

Further images may also be transmitted to the HDR constructor for processing when producing the HDR image. At least one of these images may be transmitted directly to the HDR constructor 330 without being stored in a buffer, for example as shown for short exposure data 230 in FIG. 2.

Figure 4:
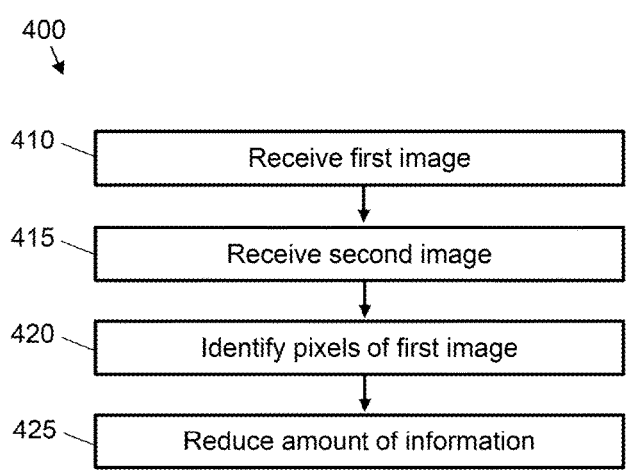
FIG. 4 shows a schematic representation of a method for producing a high dynamic range image, according to some embodiments.

FIG. 4 shows a schematic representation of a method 400 for storing a set of sensor output images for multi-exposure high dynamic range processing to produce a processed image, wherein the multi-exposure high dynamic range processing combines pixel values from one or more of the sensor output images to produce the processed image, according to an embodiment.

At block 410, a first sensor output image is received from an image sensor, wherein the first sensor output image has a first exposure.

At block 415, a second sensor output image is received from the image sensor, wherein the second sensor output image has a second exposure different than the first exposure.

At block 420, pixels of the first sensor output image having pixel values which are unlikely to have a substantial contribution to the processed image are identified. For example, where the second exposure is shorter than the first exposure, the pixels may be identified on the basis of having pixel value equal to or greater than a first predetermined threshold. These pixels may be identified as excluded from the first image. In other embodiments, the second exposure is greater than the first exposure and the first image pixels are identified on the basis of having a pixel value which is less than or equal to a predetermined threshold.

In some embodiments wherein the second exposure is shorter than the first exposure, pixels of the second sensor output image having pixel value less than or equal to a second threshold are identified as excluded from the second sensor output image, wherein the second threshold is lower than the first threshold.

As described above, a threshold may comprise a maximum pixel value such that saturated pixels are excluded from the first image. Similarly, a threshold may comprise a minimum pixel value such that black pixels are excluded from the second image.

At block 425, the amount of information stored in relation to the first image pixels is reduced on the basis of the identifying step. In an embodiment, this step comprises reducing the amount of information stored in relation to the first pixels whilst not reducing the amount of information stored in relation to pixels other than the first pixels. This allows complete information, i.e. the data values output by the image sensor, at the pixel resolution that the image sensor produces, to be stored in relation to pixels that are likely to contribute to the processed image, whilst reducing the overall amount of stored information. For example, information relating to the first pixels may be stored at a resolution lower than the pixel resolution that the image sensor produces, as compressed data, and information relating to other pixels may be stored as uncompressed data. In another embodiment, information relating to the first pixels may be stored with a lossy compression algorithm, and information relating to other pixels may be stored with a lossless compression algorithm. Lossy compression algorithms typically provide a greater degree of compression than lossless algorithms, and this embodiment thus allows a greater degree of overall compression than would be possible if all pixels were stored with a lossless compression algorithm. For example, the lossless compression algorithm may comprise storing the locations of the first pixels but not storing the values of the first pixels. The loss of data as a consequence of storing information relating to the first pixels in this manner will typically not have a significant effect on the final processed image, as such pixels are unlikely to have had a significant contribution to the processed image. In another example, information relating to the first pixels may be discarded and not stored.

In some embodiments, the first and second sensor output images are processed to produce a multi-exposure high dynamic range image, wherein the processing excludes pixels identified as unlikely to have a substantial contribution to the processed image.

The method 400 may be extended to process any number of images of different exposures to form an HDR image. For example, the method 400 may comprise receiving from the image sensor a third image, wherein the third image has a third exposure shorter than the first exposure and longer than the second exposure. The method 400 may then comprise identifying as excluded from the third image pixels of the third image having pixel values between two predetermined thresholds. For example, the method 400 may comprise excluding pixels of the third image having pixel value greater than or equal to a third threshold and less than or equal to a fourth threshold. In such an embodiment, producing the multi-exposure high dynamic range image comprises processing the third image, wherein the processing excludes pixels identified as excluded from the third image.

At least one of the thresholds may be selected based on consideration of relationships between image intensity (corresponding to brightness of light entering the image sensor) and corresponding pixel value. Schematic examples of such relationships are shown in FIG. 5.

Figure 5:
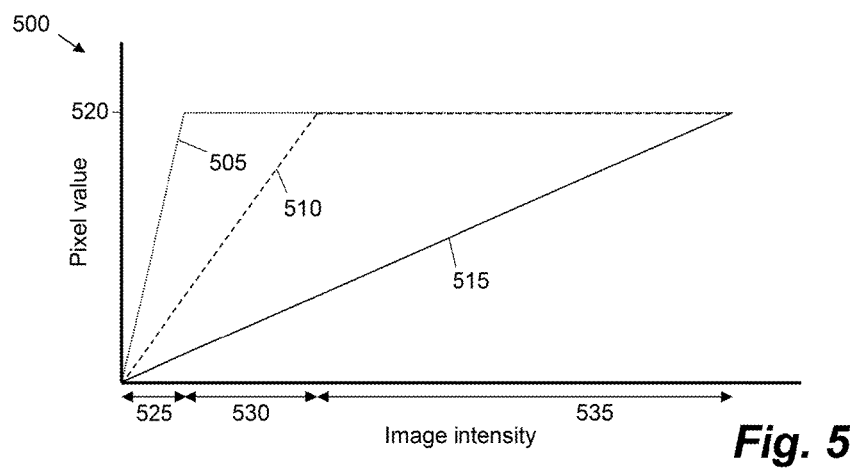
FIG. 5 shows a graph plotting pixel value as a function of image intensity for three exposures, according to some embodiments.

FIG. 5 shows a graph 500 plotting pixel value as a function of image intensity for three exposures: a long exposure 505, a medium exposure 510 and a short exposure 515. A maximum pixel value 520 represents the maximum pixel value that may be output from the image sensor. For example, for a 12-bit image sensor, the maximum pixel value will be 4096. It can be seen that for the longest exposure 520, the full range of pixel values is used to represent a relatively short range 525 of the darkest image intensities and the maximum pixel value 520 is used for any image intensity higher than the range 525. Thus the longest exposure produces an image that shows detail in dark regions and is saturated in even moderately bright regions.

For the medium exposure 510, the full range of pixel values is used to represent a wider range 525+530 of image intensities. The medium exposure thus represents brighter intensities without saturating than the long exposure 505. However, darker regions (such as the range 525) are represented by a relatively small range of low pixel values which may have poor image quality due to noise, as noise typically has a proportionally larger effect at low pixel values.

For the short exposure 515, the full range of pixel values is used to represent the widest range 525+530+535 of image intensities. In this example, the maximum pixel value 520 is only used to represent the maximum image intensity, and thus the short exposure 515 represents the full range of image intensities without saturating. However, areas of low and medium image intensity (such as the ranges 525 and 530) are represented by a relatively small range of low pixel values which, as described above, may have poor image quality due to noise.

As such, when producing a HDR image it may be desirable to take areas of low image intensity 525 from the long exposure 505, to take areas of medium image intensity 530 from the medium exposure 510, and to take areas of high image intensity 535 from the short exposure 515. This may be achieved by setting the first and third thresholds equal to pixel values corresponding to the boundary between ranges 525 and 530 for the long exposure and medium exposure, respectively, and setting the second and fourth thresholds to pixel values corresponding to the boundary between ranges 530 and 535 for the short and medium exposures, respectively. In such an embodiment, a given pixel will be excluded from two images and included in one image. As such, this minimizes the number of pixel values to be stored across all three images. A consequence of this is that producing the HDR image is efficient, as processing the images to produce the HDR image need not comprise any decision process regarding which pixels to include from each image.

In some embodiments, the third threshold corresponds to an image intensity lower than the image intensity corresponding to the first threshold. In such embodiments, pixels of image intensity between these two image intensities will not be excluded from the first image or the second image; the image intensities included in the first and second images may thus be the to overlap. Similarly, the fourth threshold may correspond to an image intensity higher than the image intensity corresponding to the second thresholds, such that the image intensities included in the second and third images overlaps. In such embodiments, known HDR construction algorithms may be used to assign values to pixels of the HDR image in regions in which pixels are included in two of the first, second and third images. A larger degree of overlap thus necessitates more sophisticated and less efficient processing to produce the HDR image, but typically also produces a higher quality image with less noticeable sharp boundaries between regions of different image intensities.

At least one of the thresholds may be selected based on a noise profile of the image sensor. For example, it may be known that a given image sensor has a probabilistic noise level N at a given pixel value. The first threshold may thus be set such that any pixel of the first image with a value higher than N from the maximum pixel value is treated as saturated and thus excluded. Similarly, the second threshold may be set such that any pixel of the second image with a value less than N is treated as zero and thus excluded.

Where the exposure is expressed as a function of parameters that influence the light sensitivity of an image, for example as a single value, at least one of the thresholds may be selected based on the ratio of the exposure of the first image to the exposure of the third image. For example, if the first image has an exposure 16 times greater than the exposure of the third image, a non-saturated pixel of the first image may be expected to have a value around 16 times that of the corresponding pixel of the third image. The first and third thresholds may be selected accordingly so that the first image comprises no saturated pixels and the third image comprises no dark pixels.

Similarly, at least one of the thresholds may be selected based on the ratio of the exposure of the third image to the exposure of the second image. For example, the second and fourth thresholds may be selected in this manner such that the third image comprises no dark pixels and no saturated pixels, and the second image comprises no dark pixels.

In some embodiments, regardless of how other thresholds are selected or whether a third image is produced, at least one threshold is based on the ratio of the first exposure to the second exposure. For example, the first and second thresholds may be selected such that the first image comprises no saturated pixels and the second image comprises no dark pixels.

In some embodiments, reducing the amount of information stored in relation to the first and/or second image pixels comprises representing the first and/or second image pixels using a run-length encoding algorithm. As the images typically comprise contiguous blocks of excluded pixels corresponding to light or dark areas, this may represent a significant decrease of image size. As such, the images may be efficiently transmitted and stored prior to production of the HDR image, for example in buffers as shown in FIG. 3.

Figure 6:
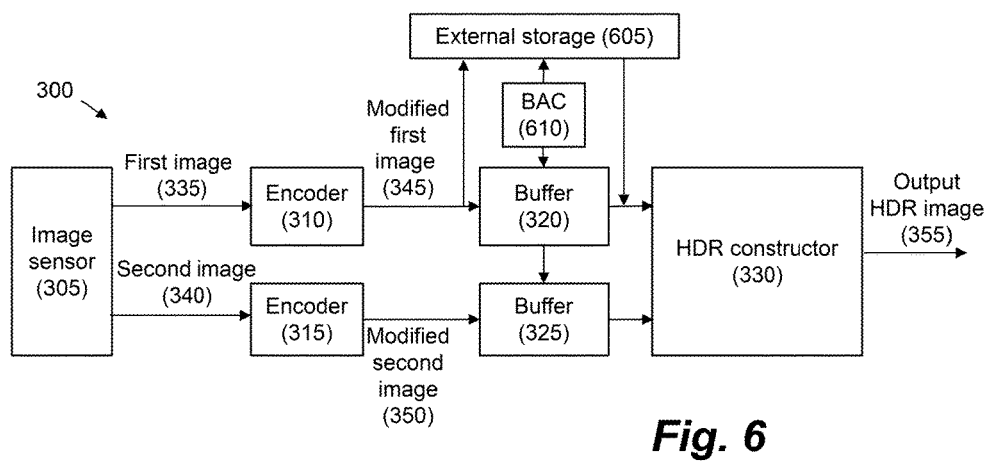
FIG. 6 shows an extended architecture for storing image data according to some embodiments.

FIG. 6 shows an extension to the architecture shown in FIG. 3, according to an embodiment. The image sensor 305 provides the first sensor output image 335 to the first encoder 310 as described above in relation to FIG. 3. The modified version 345 of the first sensor output image may then be stored either in the first buffer storage 320, or an external storage 605. The external storage 605 may for example comprise double data rate synchronous dynamic random-access memory (DDR SDRAM). For example, this scheme may be used where a finite amount of buffer storage 320 is usually sufficient to store the modified version 345 of the first sensor output image, but where the pixel data may from time to time overflow to the external storage 605, for example where more storage space is required than usual. Although FIG. 6 shows the external storage 605 configured for storing the modified version 345 of the first sensor output image, external storage may alternatively or additionally be configured for storing the modified version 350 of the second image.

The selection of whether to use buffer storage 320 or external storage 605 may be controlled by a block address controller 610. The block address controller 610 may for example comprise a scheme to allocate the memory in appropriately sized blocks, and to maintain a record of which data is stored where, such that it can be recovered.

Figure 7:
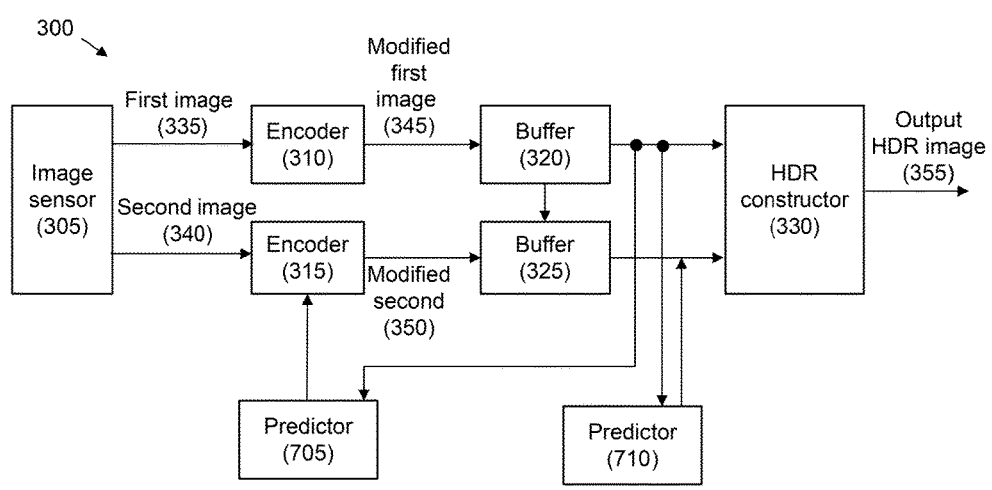
FIG. 7 shows an extended architecture for storing image data according to some embodiments.

FIG. 7 shows an extension of the architecture shown in FIG. 3, which may also be implemented in conjunction with the architecture shown in FIG. 6. This architecture exploits the strong correlation that typically exists between subsequent exposures. For example, the first sensor output image 335 may have exposure 16 times that of the second sensor output image 340. A pixel of the second sensor output image 340 may then be predicted to have a value 16 times smaller than that of the same pixel in the first sensor output image 335. This may be exploited by a first predictor 705 which receives a pixel value of the first sensor output image 335 from the first buffer 320. The first predictor 705 then predicts a value of the same pixel of the second sensor output image 340, and transmits this prediction to the second encoder 315. The encoder can then use this prediction to provide more efficient encoding. For example, as explained above, some pixels may be included in more than one image, for example pixels with value near one of the thresholds described above. Information relating to such pixels may be compressed by storing only the difference in value between the pixel value and the threshold. Alternatively or additionally, information relating to pixels for which pixel value is predicted may be compressed by storing only the difference in value between the predicted value and the actual value.

If the second sensor output image 340 is captured after the first image 335, a given pixel of the first image 335 will always have been captured before the same pixel in the second sensor output image 340. This may be exploited by a second predictor 710, which receives a pixel value of the first sensor output image 335 from the first buffer 320 and predicts a value of the same pixel of the second sensor output image 340. The second predictor 710 then transmits this prediction to the HDR constructor 330 for use in construction of the HDR image. Alternatively, where the architecture comprises a decoder (not shown in FIG. 7) for decoding the modified version 350 of the second sensor output image, the second predictor 710 may transmit the prediction to the decoder.

Embodiments may comprise only the first predictor 710, only the second predictor 720, or both the first and second predictors 710, 720.

Figure 8:
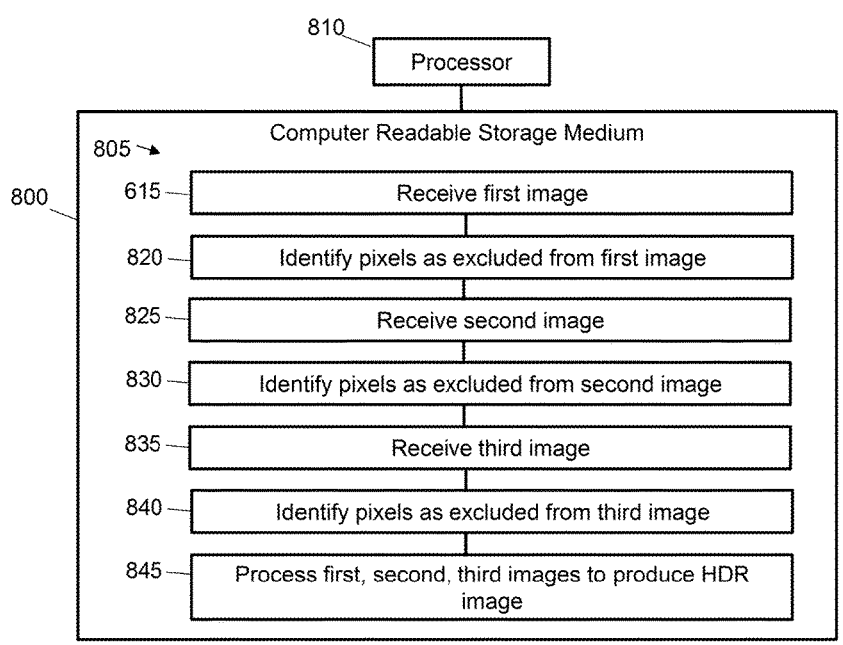
FIG. 8 shows a non-transitory computer readable storage medium according to some embodiments.

FIG. 8 shows an example of a non-transitory computer-readable storage medium 800 comprising a set of computer readable instructions 805 which, when executed by at least one processor 810, cause the at least one processor 810 to perform a method according to examples described herein. The computer readable instructions 805 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 815, the instructions 805 cause the processor 810 to receive from an image sensor a first sensor output image, wherein the first sensor output image has a first exposure.

At block, 820, the instructions 805 cause the processor 810 to identify as excluded from the first image pixels of the first sensor output image having pixel value equal to or greater than a first threshold. The first threshold corresponds to a first image intensity;

At block 825, the instructions 805 cause the processor 810 to receive from the image sensor a second sensor output image. The second sensor output image has a second exposure shorter than the first exposure.

The instructions 805 then cause the processor 810 to, at block 830, identify as excluded from the second sensor output image pixels of the second sensor output image having pixel value less than or equal to a second threshold. The second threshold corresponds to a second image intensity which is lower than the first image intensity.

At block 835, the instructions 805 cause the processor 810 to receive from the image sensor a third sensor output image. The third sensor output image has a third exposure, which is shorter than the first exposure and longer than the second exposure.

Then, at block 840, the instructions 805 cause the processor 810 to identify as excluded from the third sensor output image pixels of the third image having pixel value greater than or equal to a third threshold and less than or equal to a fourth threshold. The third threshold corresponds to a third image intensity lower than the first image intensity and the fourth threshold corresponds to a fourth image intensity higher than the second image intensity.

Finally, at block 845, the instructions 805 cause the processor 810 to process the first, second and third sensor output images to produce a multi-exposure high dynamic range image, for example as described above. The processing excludes pixels identified as excluded from the first sensor output image, excludes pixels identified as excluded from the second sensor output image and excludes pixels identified as excluded from the third sensor output image.

The above embodiments are to be understood as illustrative examples. Further embodiments are envisaged. For example, the first, second and, where appropriate, third and further images may be captured and processed in a different order to that shown and described. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method for storing a set of sensor output images for multi-exposure high dynamic range processing to produce a processed image, wherein the multi-exposure high dynamic range processing combines pixel values from one or more of the sensor output images to produce the processed image, the method comprising:

receiving, from an image sensor, a first sensor output image, wherein the first sensor output image has a first exposure;

receiving, from the image sensor, a second sensor output image, wherein the second sensor output image has a second exposure different than the first exposure;

identifying first image pixels of the first sensor output image having pixel values which are unlikely to have a substantial contribution to the processed image; and reducing an amount of information stored in relation to the first image pixels on the basis of the identifying step.

2. The method according to claim 1, comprising:

identifying second image pixels of the second sensor output image having pixel values which are unlikely to have a substantial contribution to the processed image; and reducing the amount of information stored in relation to the second image pixels on the basis of the identifying step.

3. The method according to claim 1, comprising processing the first and second images to produce a multi-exposure high dynamic range image, wherein the processing excludes pixels identified as having pixel values which are unlikely to have a substantial contribution to the processed image.

4. The method according to claim 1, wherein the second exposure is smaller than the first exposure and wherein the first image pixels are identified on the basis of having a pixel value which is more than or equal to a predetermined threshold.

5. The method according to claim 1, wherein the second exposure is greater than the first exposure and wherein the first image pixels are identified on the basis of having a pixel value which is less than or equal to a predetermined threshold.

6. The method according to claim 4, comprising:

receiving from the image sensor a third image, wherein the third image has a third exposure smaller than the first exposure and greater than the second exposure; and identifying as excluded from the third image pixels of the third image having pixel value between two predetermined thresholds.

7. The method according to claim 4, wherein at least one of the thresholds is selected based on a noise profile of the image sensor.

8. The method according to claim 6, wherein:

at least one of the thresholds is based on a ratio of the first exposure to the third exposure; or at least one of the thresholds is based on a ratio of the third exposure to the second exposure; or at least one of the thresholds is based on a ratio of the first exposure to the second exposure.

9. The method according to claim 1, wherein reducing the amount of information stored in relation to the first image pixels comprises representing the first image pixels using a run-length encoding algorithm.

10. The method according to claim 4, wherein the predetermined threshold comprises a maximum pixel value of the first image.

11. The method according to claim 5, wherein the predetermined threshold comprises a minimum pixel value of the second image.

12. An apparatus for storing a set of sensor output images for multi-exposure high dynamic range processing to produce a processed image, wherein the multi-exposure high dynamic range processing combines pixel values from one or more of the sensor output images to produce the processed image, the apparatus comprising:

an image sensor;

a first encoder configured to:
  receive from the image sensor a first sensor output image, wherein the first sensor output image has a first exposure; and
  produce a modified version of the first sensor output image, wherein producing the modified version of the first image comprises:
    identifying first image pixels of the first sensor output image having pixel values which are unlikely to have a substantial contribution to the processed image, and
    reducing an amount of information stored in relation to the first image pixels on the basis of the identifying step;
a first buffer storage configured to receive and store the modified version of the first image;
a second encoder configured to:
  receive from the image sensor a second sensor output image, wherein the second sensor output image has a second exposure different than the first exposure; and
  produce a modified version of the second sensor output image, wherein producing the modified version of the second image comprises:
    identifying second image pixels of the second sensor output image having pixel values which are unlikely to have a substantial contribution to the processed image; and
    reducing an amount of information stored in relation to the second image pixels on the basis of the identifying step of the second image pixels, and
a second buffer storage configured to receive and store the modified version of the second image.

13. The apparatus according to claim 12, comprising a high dynamic range image constructor configured to:
  receive the modified version of the first sensor output image from the first buffer;
  receive the modified version of the second sensor output image from the second buffer; and
  process the modified version of the first sensor output image and the modified version of the second sensor output image to produce the processed image, wherein the processing excludes pixels identified as having pixel values which are unlikely to have a substantial contribution to the processed image.

14. The apparatus according to claim 12, wherein the first buffer stores the modified version of the first sensor output image as a first compressed image and/or the second buffer stores the modified version of the second sensor output image as a second compressed image.

15. The apparatus according to claim 14, wherein storing the first and/or second compressed images comprises using a run-length encoding algorithm to indicate pixels excluded from the modified versions of the first and/or second images.

16. The apparatus according to claim 12, wherein the first and second buffers are configured to simultaneously transmit the modified versions of the first and second sensor output images to a high dynamic range image constructor.

17. A non-transitory, computer-readable storage medium comprising a set of computer-readable instructions stored thereon which, when executed by at least one processor, cause the at least one processor to:
  receive, from an image sensor, a first sensor output image, wherein the first sensor output image has a first exposure;
  identify, as excluded from the first sensor output image, pixels of the first sensor output image having pixel value equal to or greater than a first threshold, the first threshold corresponding to a first image intensity;
  receive, from the image sensor, a second sensor output image, wherein the second sensor output image has a second exposure smaller than the first exposure;
  identify, as excluded from the second sensor output image, pixels of the second sensor output image having pixel value less than or equal to a second threshold, the second threshold corresponding to a second image intensity lower than the first image intensity;
  receive, from the image sensor, a third sensor output image, wherein the third sensor output image has a third exposure smaller than the first exposure and greater than the second exposure;
  identify, as excluded from the third sensor output image, pixels of the third sensor output image having pixel value greater than or equal to a third threshold and less than or equal to a fourth threshold, wherein the third threshold corresponds to a third image intensity lower than the first image intensity and the fourth threshold corresponds to a fourth image intensity higher than the second image intensity; and
  process the first, second and third sensor output images to produce a multi-exposure high dynamic range image, wherein the processing excludes pixels identified as excluded from the first sensor output image, excludes pixels identified as excluded from the second sensor output image and excludes pixels identified as excluded from the third sensor output image.

* * * * *